(12) United States Patent
Elsayed et al.

(10) Patent No.: US 10,933,400 B1
(45) Date of Patent: Mar. 2, 2021

(54) SYNTHESIS OF 3D-POROUS SR(II)/IR(III) LAYERED HYDROXIDE BALLS COMPOSED OF HEXAGONAL SHEETS FOR WATER PURIFICATION

(71) Applicant: King Abdulaziz University, Jeddah (SA)

(72) Inventors: Waleed Elsayed Mahmoud Elsayed, Jeddah (SA); Ahmed Abdullah Salem Al-Ghamdi, Jeddah (SA); Yusuf Abdulaziz Al-Turki, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/000,761

(22) Filed: Aug. 24, 2020

(51) Int. Cl.
*B01J 20/22* (2006.01)
*B01J 20/04* (2006.01)
*B01J 20/28* (2006.01)
*B01J 20/30* (2006.01)
*C02F 1/28* (2006.01)
(Continued)

(52) U.S. Cl.
CPC ............ *B01J 20/041* (2013.01); *B01J 20/22* (2013.01); *B01J 20/28004* (2013.01); *B01J 20/28019* (2013.01); *B01J 20/3085* (2013.01); *C02F 1/288* (2013.01); *C02F 1/281* (2013.01); *C02F 1/285* (2013.01); *C02F 2101/34* (2013.01); *C02F 2101/36* (2013.01); *C02F 2101/363* (2013.01); *C02F 2103/007* (2013.01); *C02F 2303/16* (2013.01)

(58) Field of Classification Search
None
See application file for complete search history.

(56) References Cited

U.S. PATENT DOCUMENTS

| 7,786,202 B2 | 8/2010 | Schomaker | |
| 8,317,641 B1 * | 11/2012 | Lowinger | A63B 43/02 473/597 |

(Continued)

FOREIGN PATENT DOCUMENTS

| CN | 103394329 A | 11/2013 | |
| CN | 110394185 A | 11/2019 | |
| KR | 1912805 B1 | 10/2018 | |
| WO | WO-2015083840 A1 * | 6/2015 | ........ B01J 20/3085 |

OTHER PUBLICATIONS

Wang, J., et al., Arsenic removal from water/wastewater using layered double hydroxide derived adsorbents, a critical review, RSC Adv., 2018, 8, 22694-22709 ( DOI: 10.1039/C8RA03647K ) (Year: 2018).*

(Continued)

*Primary Examiner* — Chester T Barry
(74) *Attorney, Agent, or Firm* — W & C IP

(57) ABSTRACT

Three dimensional (3D), porous, Sr(II)/Ir(III) layered double hydroxide materials with a spherical/balls like shape, are composed of nanohexagonal sheets intercalated with 1-(1-hydroxy-4-methyl-2-phenylazo)-2-naphthol-4-sulfonic acid have a number of uses including removing undesirable organic compounds and materials from polluted water. This removal can be accomplished without disturbing the pH of the water, and with high absorption capacity (2000 mg of pollutants/1 mg of LDH). The spherical/ball like materials are easily cleaned and are amenable to being reused several times.

14 Claims, 5 Drawing Sheets

(51) Int. Cl.
    *C02F 103/00*     (2006.01)
    *C02F 101/36*     (2006.01)
    *C02F 101/34*     (2006.01)

(56) References Cited

U.S. PATENT DOCUMENTS

| | | | |
|---|---|---|---|
| 10,037,839 B2* | 7/2018 | Wang | B01J 20/3085 |
| 10,392,267 B2* | 8/2019 | Elsayed | C02F 1/288 |
| 10,876,088 * | 12/2020 | Griffith | C12M 25/14 |
| 2007/0088161 A1* | 4/2007 | Stockel | C07F 9/58 546/22 |
| 2013/0260990 A1* | 10/2013 | Kwon | B01J 20/06 502/414 |
| 2018/0297864 A1* | 10/2018 | Elsayed | C02F 1/288 |
| 2020/0306725 A1* | 10/2020 | Zahir | B01J 20/0207 |

OTHER PUBLICATIONS

Nalawade et al., Layered double hydroxides: A review, J Sci Ind. Res., vol. 68 Mar. 2009, pp. 267-272 (Year: 2009).*

Seitz, et al., A highly active and stable IrOx/SrIrO3 catalyst for the oxygen evolution reaction, Science vol. 353 Issue 6303 (2016), 1011-1014. (Year: 2016).*

M. Bhaumi et al, "Synergetic enhancement of Cr(Vl) removal from aqueous solutions using polyaniline@Ni(OH)2 nanocomposites adsorbent", Journal of Environmental Chemical Engineering, Apr. 2018, vol. 6, No. 2, pp. 2514-2527.

Q. He et al, "Synthesis and photochemical properties of zinc-aluminum layered double hydroxide/organic UV ray absorbing molecule/silica nanocomposites", Journal of Physics and Chemistry of Solids, Mar. 2004, vol. 65, No. 2-3, pp. 395-402.

* cited by examiner

US 10,933,400 B1

SYNTHESIS OF 3D-POROUS SR(II)/IR(III) LAYERED HYDROXIDE BALLS COMPOSED OF HEXAGONAL SHEETS FOR WATER PURIFICATION

FIELD OF THE INVENTION

The invention is generally related to water purification. More specifically, the invention provides a novel three dimensional (3D) porous structure of a Sr(II)/Ir(III) layered double hydroxide that is composed of nanohexagonal sheets intercalated with 1-(1-hydroxy-4-methyl-2-phenylazo)-2-naphthol-4-sulfonic acid.

BACKGROUND

Developments in agriculture, anthropogenic, and industrial activities have caused the introduction of huge amounts of pollutants in the environment. Most of these pollutants came from the synthetic organic compounds which are often discharged to the water environment (e.g. rivers, streams, ocean, ground water, etc.). These organic compound pollutants are of paramount concern owing to their tendency to be accumulated and to their high toxicity. Examples include organochlorine pesticides (OCPs), hexachlorobenzene (HCB), polybrominated diphenyl ethers, polychlorinated biphenyls (PCBs), and other byproducts of industrial processes or combustion such as furans and dioxins. Getting rid of these organic contaminants from wastewater effluents is a matter of high concern for this planet.

The presence of low concentrations of organic compounds and their derivatives in water demonstrates that some organic products are not easy to be eliminated from the wastewater. Different methods have been devoted to get pure water, including boiling the water prior to drinking, dissolving tablets of iodoform in the water, etc. Boiling of water requires a long time and sometimes specialized equipment, neither of which may be available when water is required. Tablets of iodoform produce undesirable taste so it is not a popular alternative.

The rest of developed water purification devices have been either too heavy or too large or have rendered the water quite distasteful. Some apparatus have limited capacity and can allow the passage of water even when its purification capacity is exhausted. This can lead to a user drinking contaminated water without knowledge of the fact of contamination.

SUMMARY

An important objective of the present invention is to provide a method for preparing novel 3D porous Sr(II)/Ir (III) layered double hydroxide with balls like shape composed of nanohexagonal sheets for water purification.

Another objective of the present invention is to provide a one step facile and low cost method for the synthesis of novel 3D porous Sr(II)/Ir(III) layered double hydroxide with balls like shape composed of nanohexagonal sheets intercalated with 1-(1-hydroxy-4-methyl-2-phenylazo)-2-naphthol-4-sulfonic acid for adsorption of organic compounds from contaminated water.

Still another objective of the present invention is to provide reusable novel 3D porous Sr(II)Ir(III) layered double hydroxide with balls like shape composed of nanohexagonal sheets intercalated with 1-(1-hydroxy-4-methyl-2-phenylazo)-2-naphthol-4-sulfonic acid for adsorption of organic compounds from contaminated water.

Yet another objective of the present invention is to provide a process for the synthesis of novel 3D porous Sr(II)/Ir(III) layered double hydroxide (LDH) with balls like shape composed of nanohexagonal sheets intercalated with 1-(1-hydroxy-4-methyl-2-phenylazo)-2-naphthol-4-sulfonic acid for adsorption of organic compounds from contaminated water with high absorption capacity reached to 2000 mg of organic pollutants for every 1 mg of LDH.

An aspect of the invention is to provide a recipe to prepare layered double hydroxides nanoarchitectures with specific structure control for efficient adsorbing performance. The efficient performance for adsorbing layered hydroxides should have high adsorbing capacity, they will be permitted to be reused several times, and they will permit easy cleaning after using. To achieve these goals, it is important to prepare nanostructures with precise morphology and contain smart adsorbing materials among their inner structure. In this invention, we provide an efficient synthetic recipe to prepare 3D porous Sr(II)/Ir(III) layered double hydroxide with a shape of a ball or sphere. The balls are composed of nanohexagonal sheets intercalated with 1-(1-hydroxy-4-methyl-2-phenylazo)-2-naphthol-4-sulfonic acid. The balls function as a powerful water purification structure.

DESCRIPTION

Figure 1A:
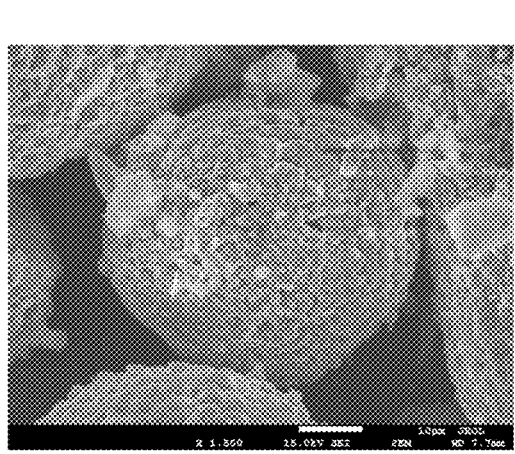
FIG. 1A. A SEM image for the prepared Sr(II)/Ir(III)-LDH powders

The present invention provides a method for preparing 3D porous Sr(II)/Ir(III) layered double hydroxide with a spherical (balls like) shape composed of nanohexagonal sheets intercalated with 1-(1-Hydroxy-4-methyl-2-phenylazo)-2-naphthol-4-sulfonic acid, and the use of those materials for water purification. In addition, the present invention provides for the synthesis of Sr(II)/Ir(III) [$Sr^{2+}/Ir^{3+}$] layered double hydroxide with the novel morphology which looks like balls like shape and is composed of nanohexagonal sheets, wherein the synthesis route is by a hydrothermal method.

In the production of the materials of this invention a source of Sr(II) is needed. A preferred Sr(II) source is strontium acetate. Other sources may include strontium nitrate, strontium chloride, strontium perchlorates or strontium sulfate.

In the production of the materials of this invention a source of Ir(III) is needed. A preferred Ir(III) source is tetrairidium dodecacarbonyl. Other sources may include iridium nitrate, iridium chloride, iridium perchlorates or iridium sulfate.

In the production of the materials of this invention the Sr(II) source is mixed with the Ir(III) source to produce a Sr(II)/Ir(III) solution. For example, strontium acetate may be mixed with tetrairidium dodecacarbonyl with molar ratio of 3:1. In a preferred embodiment, strontium acetate is mixed with tetrairidium dodecacarbonyl with a molar ratio of 3:1 and is dissolved in 80 mL of deionized water and stirred for 20 minutes at 55° C.

In the practice of the invention, the Sr(II)/Ir(III) solution is combined with 1-(1-hydroxy-4-methyl-2-phenylazo)-2-naphthol-4-sulfonic acid, $HOC_{10}H_5[N=NC_6H_3(OH)CH_3]SO_3H$ (1-1H-4MP-2NS) to produce a Sr(II)/Ir(III)/1-1H-4MP-2NS solution. An exemplary procure for this is to prepare a solution of 1-(1-hydroxy-4-methyl-2-phenylazo)-2-naphthol-4-sulfonic acid by, for example, dissolving 5 mg of this acid into 10 ml of deionized water. 10 ml of the solution of 1-(1-hydroxy-4-methyl-2-phenylazo)-2-naphthol-4-sulfonic acid (1-1H-4MP-2NS) can then be added to the Sr(II)/Ir(III) solution and kept stirring for 12 min. at 60° C. to produce the Sr(II)/Ir(III)/1-1H-4MP-2NS solution.

The 3D porous Sr(II)Ir(III) layered double hydroxide with balls like shape composed of nanohexagonal sheets intercalated with 1-(1-hydroxy-4-methyl-2-phenylazo)-2-naphthol-4-sulfonic acid are formed from the Sr(II)/Ir(III)/1-1H-4MP-2NS solution. This can be accomplished by adding dropwise a 4-methylmorpholine N-oxide, $CH_{11}NO_2$, (0.3 mM) solution to the Sr(II)/Ir(III)/1-1H-4MP-2NS solution until the pH of the whole mixture reached to 10.5 The 4-methylmorpholine N-oxide functions as a source for the hydroxyl groups. It is used to convert the Sr(II)/Ir(III)/1-1H-4MP-2NS solution to Sr(II)/Ir(III)OH/1-1H-4MP-2NS solution, which is an essential step to obtain layered double hydroxide. Other exemplary sources of hydroxyl groups include ammonium hydroxide, potassium hydroxide, sodium hydroxide or calcium hydroxide.

This mixture solution can then be poured into 60 ml Teflon lined autoclave and placed in a (Sineo-Uwav-1000M) microwave oven. In preferred embodiment, the microwave power is set at 400 W and temperature at 170° C. for 35 min and then left to cool down naturally at room temperature. Microwave energy is used to obtain the microsphere or microball composed of hexagonal nanosheets. Other methods of applying energy produce nanoparticles or nanosheets or nanorods. These morphologies are not as useful for the adsorption of contaminates from water.

With the cooled down mixture, the supernatant is collected by filtration, washed with deionized water and ethanol and dried at 70° C. for 8 h to obtain a powder. The obtained powder has 3D porous materials, in a spherical (balls like) shape, with a mean diameter of 721±13 m composed of nanohexagonal sheets which have an average thickness of 33±4 nm, average edge length of 220±14 nm, and an average diameter of 655±23 nm.

X-ray diffraction (XRD) analysis showed that the powder is indexed to a hexagonal lattice with 3R rhombohedral symmetry of the $Sr^{2+}/Ir^{3+}$ layered double hydroxide. In a preferred embodiment, the intercalation of $Sr^{2+}/Ir^{3+}$ layered double hydroxide 1-(1-hydroxy-4-methyl-2-phenylazo)-2-naphthol-4-sulfonic acid leads to an increase of the interlaminar space between brucite layers $Sr^{2+}/Ir^{3+}$ layered double hydroxide from 0.8 nm to 1.98 nm.

The synthesized 3D porous Sr(II)/Ir(III) layered double hydroxide balls like shape composed of nanohexagonal sheets intercalated with 1-(1-hydroxy-4-methyl-2-phenylazo)-2-naphthol-4-sulfonic acid can adsorb organic compounds from the contaminated water. In preferred embodiment, 1 mg of the synthesized 3D porous Sr(II)/Ir(III) layered double hydroxide balls like shape composed of nanohexagonal sheets intercalated with 1-(1-hydroxy-4-methyl-2-phenylazo)-2-naphthol-4-sulfonic acid can adsorb 2000 mg/L of organic compounds such as diisobutyl phthalate (DIBP), organophosphates, polychlorinated biphenyl (PCB), bisphenol A (BPA), vinyl chloride, bis(2-ethylhexyl) adipate (DEHA), and perfluorinated compounds (PFC) (e.g., chlorofluorocarbons used as refrigerants) in 7-10 min.

The synthesized 3D porous Sr(II)/Ir(III) layered double hydroxide balls like shape composed of nanohexagonal sheets intercalated with 1-(1-hydroxy-4-methyl-2-phenylazo)-2-naphthol-4-sulfonic acid can be cleaned and reused multiple times. For example, the cleaning and reuse may be more than 5000, more than 6000, or more than 7000 times while keeping its efficiency.

The following examples are given for purpose of illustrative discussion of preferred embodiments of the invention and therefore should not be construed to limit the scope of the invention.

Example 1

Preparation of 3D Porous Sr(II)/Ir(III) Layered Double Hydroxide Balls Like Shape Composed of Nanohexagonal Sheets.

Figure 1B:
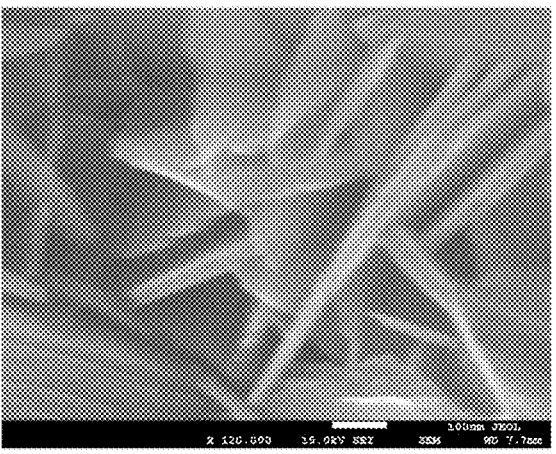
FIG. 1B. High resolution SEM image for the prepared Sr(II)/Ir(III)-LDH powders
Figure 2:
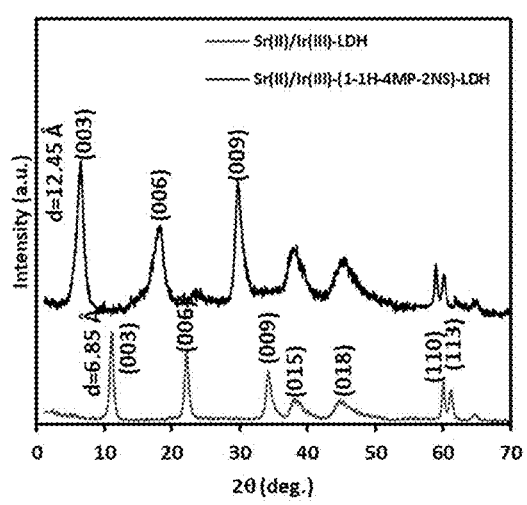
FIG. 2. The XRD patterns of the prepared Sr(II)/Ir(III)-LDH with and without intercalation with 1-1H-4MP-2NS.

In a conical flask 0.33 mmol of strontium acetate and 0.11 mmol of tetrairidium dodecacarbonyl are 80 mL of deionized water and stirred for 20 minutes at 55° C. In a separate flask a solution of 1-(1-hydroxy-4-methyl-2-phenylazo)-2-naphthol-4-sulfonic acid, $HOC_{10}H_5[N=NC_6H_3(OH)CH_3]SO_3H$, was prepared by dissolving 5 mg of this acid into 10 ml of deionized water. About 10 ml of the solution of 1-(1-hydroxy-4-methyl-2-phenylazo)-2-naphthol-4-sulfonic acid (1-1H-4MP-2NS) was added to the Sr(II)/Ir(III) solution and kept stirring for 12 min. at 60° C. Then 0.3 mM of 4-methylmorpholine N-oxide, $CH_{11}NO_2$, solution was added drop wise simultaneously to the Sr(II)/Ir(III)/1-1H-4MP-2NS solution until the pH of the whole mixture reached to 10.5. The whole mixture solution was poured into 60 ml Teflon lined autoclave and placed in (Sineo-Uwav-1000M) microwave oven power of 400 W and temperature of 170° C. for 35 min and then left to cool down naturally at room temperature. The supernatant is collected by filtration, washed with deionized water and ethanol and dried at 70° C. for 8 h. The morphology of the product is presented in FIG. 1a and FIG. 1b. FIG. 2 reveals the XRD for the product.

Example 2

Adsorption of Diisobutyl Phthalate (DIBP) in Tape Water by the 3D Porous Sr(II)/Ir(III) Layered Double Hydroxide Balls Like Shape Composed of Nanohexagonal Sheets Intercalated with 1-1H-4MP-2NS.

Figure 3:
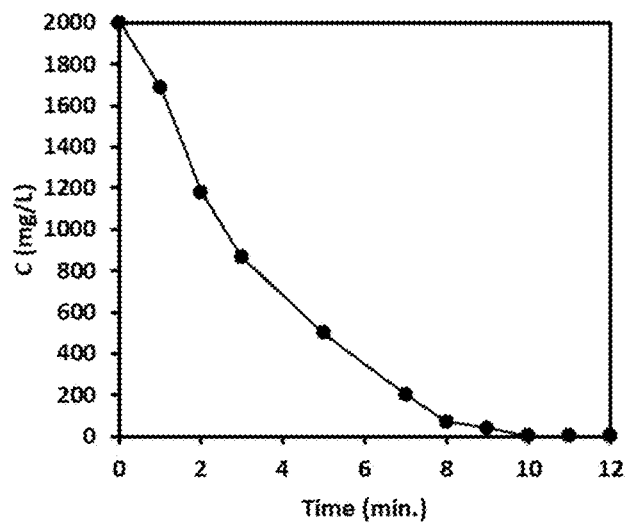
FIG. 3. Graph showing the adsorption of diisobutyl phthalate (DIBP) in tap water by the 3D porous Sr(II)/Ir(III)/1-1H-4MP-2NS layered double hydroxide balls like shape composed of nanohexagonal sheets.

The process of detection of the amount of pharmaceutical compounds adsorbed by the 3D porous Sr(II)/Ir(III)/1-1H-4MP-2NS layered double hydroxide balls like shape composed of nanohexagonal sheets in water was examined for the diisobutyl phthalate (DIBP). In such experiment, a solution containing 2000 mg/L of diisobutyl phthalate (DIBP) was dispersed in tap water. The tap water was used in order to simulate a real situation and was previously analyzed for identifying eventual unknown pollutants. The initial solution conductivity was 775 mS/cm, and the pH was 7. About 1 mg of the 3D porous Sr(II)/Ir(III)/1-1H-4MP-2NS layered double hydroxide balls like shape composed of nanohexagonal sheets was added to the diisobutyl phthalate (DIBP) solution. UV-visible absorption spectra of the aqueous solutions before and after treatment were measured by a spectrophotometer (JASCO-V-750), in the wavelength range λ=200-600 nm at various interval times. The plot of the amount of diisobutyl phthalate (DIBP) removed against time is presented in FIG. 3

Example 3

Adsorption of Organophosphates in Tape Water by the 3D Porous Sr(II)/Ir(III) Layered Double Hydroxide Balls Like Shape Composed of Nanohexagonal Sheets Intercalated with 1-1H-4MP-2NS.

Figure 4:
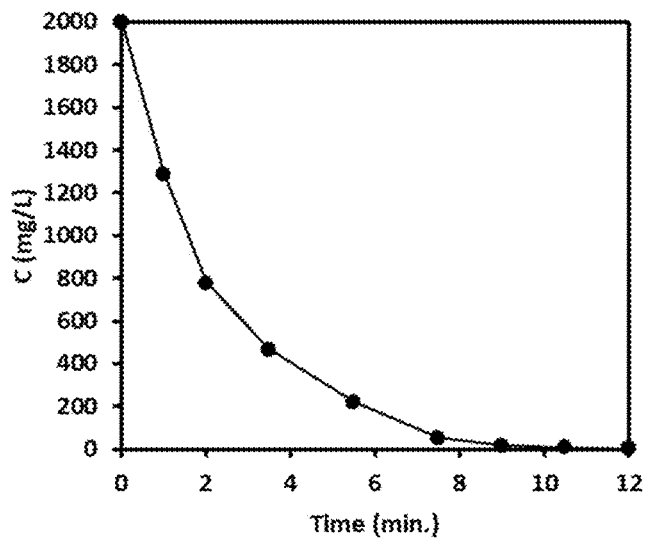
FIG. 4. Graph showing the adsorption of organophosphates in tape water by the 3D porous Sr(II)/Ir(III)/1-1H-4MP-2NS layered double hydroxide balls like shape composed of nanohexagonal sheets.

The process of adsorption of organophosphates was carried out under the same conditions of Example 2, except that organophosphate was used. The plot of the amount of organophosphates removed against time is presented in FIG. 4

Example 4

Adsorption of Polychlorinated Biphenyl (PCB) in Tape Water by the 3D Porous Sr(II)/Ir(III) Layered Double Hydroxide Balls Like Shape Composed of Nanohexagonal Sheets Intercalated with 1-1H-4MP-2NS.

Figure 5:
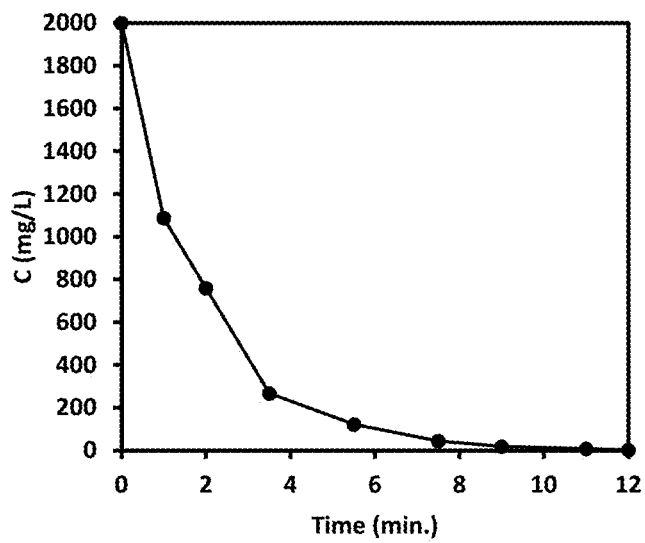
FIG. 5. Graph showing the adsorption of polychlorinated biphenyl (PCB) in tap water by the 3D porous Sr(II)/Ir(III)/1-1H-4MP-2NS layered double hydroxide balls like shape composed of nanohexagonal sheets.

The process of adsorption of polychlorinated biphenyl (PCB) was carried out under the same conditions of Example 2, except that olychlorinated biphenyl (PCB) was used. The plot of the amount of polychlorinated biphenyl (PCB) drugs removed against time is presented in FIG. 5.

Example 5

Adsorption of Bisphenol a (BPA) in Tape Water by the 3D Porous Sr(II)/Ir(III) Layered Double Hydroxide Balls Like Shape Composed of Nanohexagonal Sheets Intercalated with 1-1H-4MP-2NS.

Figure 6:
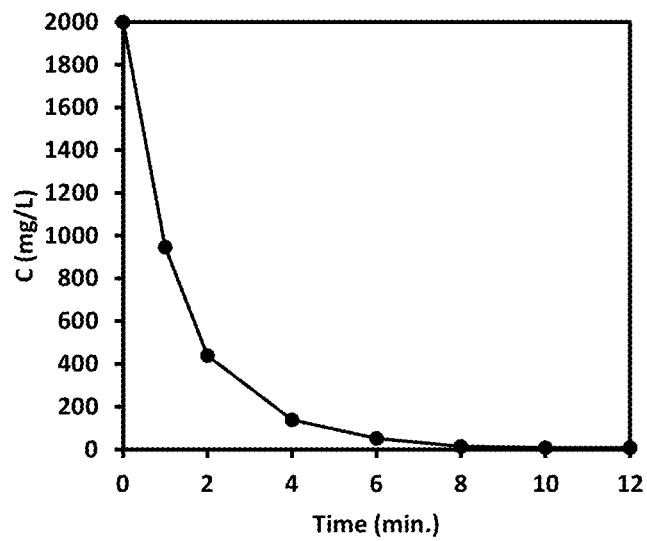
FIG. 6. Graph showing the adsorption of bisphenol A (BPA) in tape water by the 3D porous Sr(II)/Ir(III)/1-1H-4MP-2NS layered double hydroxide balls like shape composed of nanohexagonal sheets.

The process of adsorption of bisphenol A (BPA) was carried out under the same conditions of Example 2, except that bisphenol A (BPA) was used. The plot of the amount of bisphenol A (BPA) removed against time is presented in FIG. 6.

Example 6

Adsorption of Vinyl Chloride in Tape Water by the 3D Porous Sr(II)/Ir(III) Layered Double Hydroxide Balls Like Shape Composed of Nanohexagonal Sheets Intercalated with 1-1H-4MP-2NS.

Figure 7:
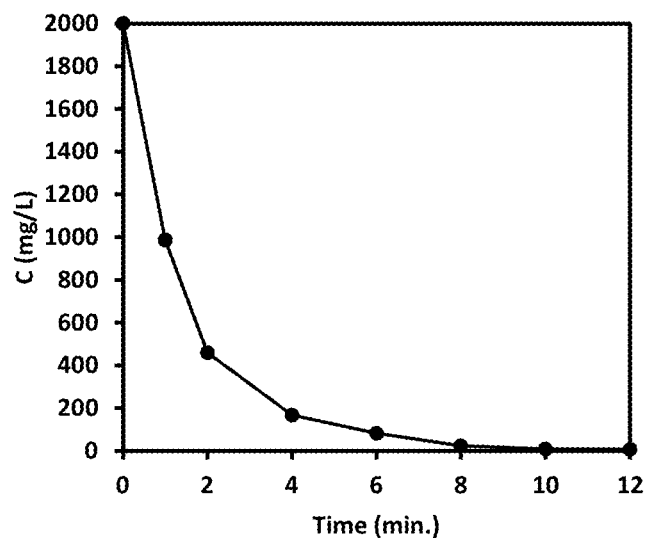
FIG. 7. Graph showing the adsorption of vinyl chloride in tape water by the 3D porous Sr(II)/Ir(III)/1-1H-4MP-2NS layered double hydroxide balls like shape composed of nanohexagonal sheets.

The process of adsorption of Vinyl chloride was carried out under the same conditions of Example 2, except that Vinyl chloride was used. The plot of the amount of Vinyl chloride removed against time is presented in FIG. 7.

Example 7

Adsorption of Bis(2-Ethylhexyl) Adipate (DEHA) in Tape Water by the 3D Porous Sr(II)/Ir(III) Layered Double Hydroxide Balls Like Shape Composed of Nanohexagonal Sheets Intercalated with 1-1H-4MP-2NS.

Figure 8:
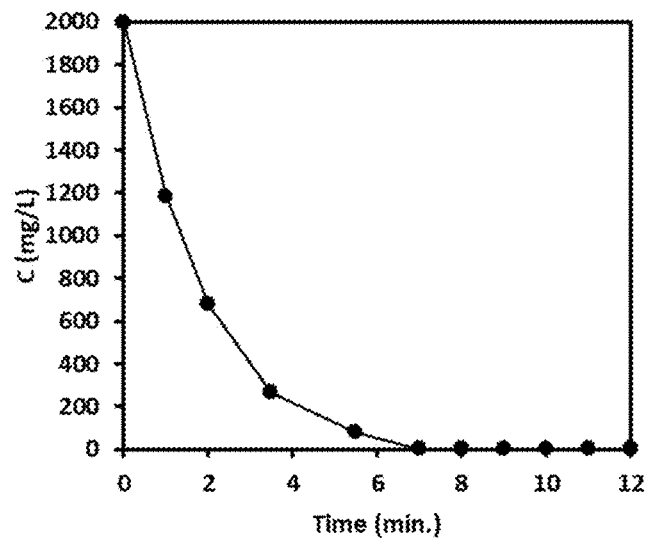
FIG. 8. Graph showing the adsorption of bis(2-ethylhexyl) adipate (DEHA) in tape water by the 3D porous Sr(II)/Ir(III)/1-1H-4MP-2NS layered double hydroxide balls like shape composed of nanohexagonal sheets.

The process of adsorption of Bis(2-ethylhexyl) adipate (DEHA) was carried out under the same conditions of Example 2, except that Bis(2-ethylhexyl) adipate (DEHA) was used. The plot of the amount of Bis(2-ethylhexyl) adipate (DEHA) removed against time is presented in FIG. 8.

Example 8

Adsorption of Perfluorinated Compound (PFC) in Tape Water by the 3D Porous Sr(II)/Ir(III) Layered Double Hydroxide Balls Like Shape Composed of Nanohexagonal Sheets Intercalated with 1-1H-4MP-2NS.

Figure 9:
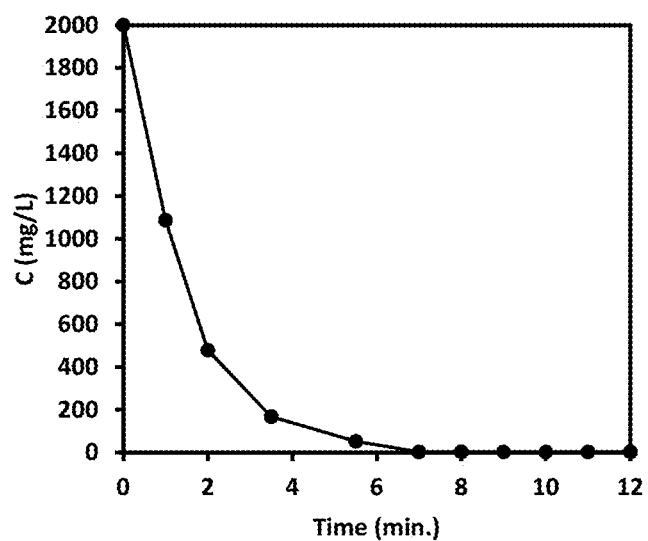
FIG. 9. Graph showing the adsorption of a perfluorinated compound (PFC) in tape water by the 3D porous Sr(II)/Ir (III)/1-1H-4MP-2NS layered double hydroxide balls like shape composed of nanohexagonal sheets.

The process of adsorption of Perfluorinated compound (PFC) was carried out under the same conditions of Example 2, except that Perfluorinated compound (PFC) was used. The plot of the amount of Perfluorinated compound (PFC) removed against time is presented in FIG. 9.

Example 9

The Cleaning and Reuse Process of the 3D Porous Sr(II)/Ir(III) Layered Double Hydroxide Balls Like Shape Composed of Nanohexagonal Sheets Intercalated with 1-1H-4MP-2NS.

The 3D porous Sr(II)/Ir(III) layered double hydroxide balls like shape composed of nanohexagonal sheets intercalated with 1-1H-4MP-2NS are cleaned after each adsorption process and reused.

Figure 10:
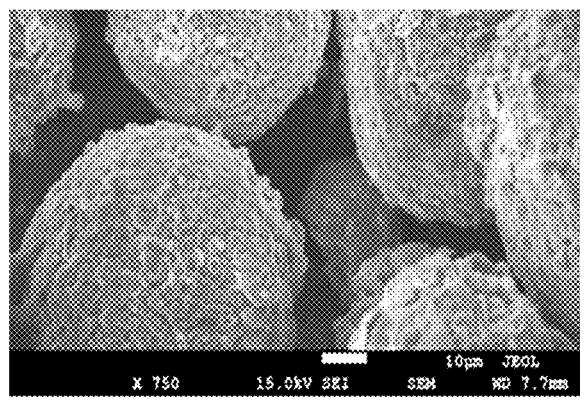
FIG. 10. An SEM image for the Sr(II)/Ir(III)-LDH powders after reuse 7000 times.

The cleaning process is started by separating the powder from water after adsorption process by filtration using filter papers, then inserting this powder in a mixture solution of diluted sulfuric acid (0.1M) and left for 2 h. After that, the powder is washed with deionized water and left to dry naturally for 1 h. This produces a powder of the layered double hydroxide (LDH) balls of Sr(II)/Ir(III) somewhat depleted of the 1-(1-hydroxy-4-methyl-2-phenylazo)-2-naphthol-4-sulfonic acid. To re-intercalate the LDH with 1-(1-hydroxy-4-methyl-2-phenylazo)-2-naphthol-4-sulfonic acid, the LDH is dispersed into a solution of 1-(1-Hydroxy-4-methyl-2-phenylazo)-2-naphthol-4-sulfonic acid prepared by dissolving 10 mg of it into 10 ml of deionized water. Then it is used again to remove the organic compounds. This process repeated each time for reuse of the LDH for adsorbing the organic compounds. The LDH powder was used more than 7000 times during a year, while preserving its efficiency and balls shape without any change as shown in FIG. 10.

The invention claimed is:
1. A composition comprising three dimensional (3D) Sr(II)/Ir(III) layered double hydroxide, with a spheroid shape having a mean diameter of 721±13 μm composed of nanohexagonal sheets intercalated with 1-(1-hydroxy-4-methyl-2-phenylazo)-2-naphthol-4-sulfonic acid.

2. The composition of claim 1 wherein the nanohexagonal sheets have an average thickness of 33±4 nm, an average edge length of 220±14 nm, and an average diameter of 655±23 nm.

3. The composition of claim 1 formed by the process of combining in a solution a source of Sr(II) and a source of Ir(III) to produce a Sr(II)/Ir(III) solution;
combining the Sr(II)/Ir(III) solution with 1-(1-hydroxy-4-methyl-2-phenylazo)-2-naphthol-4-sulfonic acid to produce a Sr(II)/Ir(III)/1-1H-4MP-2NS solution;
combining the Sr(II)/Ir(III)/1-1H-4MP-2NS solution with a source of the hydroxyl groups to produce an alkaline mixture of Sr(II)/Ir(III)OH/1-1H-4MP-2NS;
exposing the alkaline mixture to microwave energy under conditions sufficient to form from the alkaline mixture a powder containing the three dimensional (3D) Sr(II)/Ir(III) layered double hydroxide, with a spheroid ball-like shape having a mean diameter of 721±13 m composed of nanohexagonal sheets intercalated with 1-(1-hydroxy-4-methyl-2-phenylazo)-2-naphthol-4-sulfonic acid.

4. The composition of claim 1 formed by the process of
a) dissolving strontium acetate and tetrairidium dodecacarbonyl with molar ratio of 3:1 in 80 mL of deionized water and stirred for 20 minutes at 55° C.; then
b) adding 10 mL of 1-(1-hydroxy-4-methyl-2-phenylazo)-2-naphthol-4-sulfonic acid (1-1H-4MP-2NS) to the Sr(II)/Ir(III) solution while stirring for 12 min. at 60° C.;
c) adding 4-Methylmorpholine N-oxide solution drop wise simultaneously to the Sr(II)/Ir(III)/1-1H-4MPN-2NS solution until the pH of the whole mixture reaches 10.5;
d) pouring the whole mixture solution into a polytetrafluoroethylene lined autoclave and placing it in microwave oven at power of 400 W and temperature at 170° C. for 35 minutes; then
e) cooling the composition down to room temperature to produce a final composition with a supernatant;
f) collecting the supernatant by filtration, and washing it with deionized water, and drying it at 70° C. for 8 h.

5. A water purifying or cleaning material comprising a powdered or dispersed in liquid material having a composition according to claim 1.

6. A method of treating water to remove contaminants, comprising the steps of:
adding to water a composition comprising three dimensional (3D) Sr(II)/Ir(III) layered double hydroxide, with a spheroid shape having a mean diameter of 721±13 m composed of nanohexagonal sheets intercalated with 1-(1-hydroxy-4-methyl-2-phenylazo)-2-naphthol-4-sulfonic acid; and
adsorbing one or more compounds in the water with the composition.

7. The method of claim 6 wherein the one or more compounds are pharmaceutical compounds.

8. The method of claim 6 wherein the one or more compounds are organic compounds selected from the group consisting of diisobutyl phthalate biphenyls (DIBP), organophosphates, polychlorinated biphenyls (PCB), bisphenol A (BPA), vinyl chloride, bis(2-ethylhexyl) adipate (DEHA) and perfluorinated compounds (PFC).

9. The method of claim 8 wherein the one or more compounds are adsorbed from the water within 7-10 minutes.

10. The method of claim 8 wherein the adsorbing step adsorbs 2000 mg/L of the organic compounds adsorbed from the water in 10 minutes or less.

11. The method of claim 6 further comprising the steps of washing the composition after the adsorbing step;
re-intercalating 1-(1-hydroxy-4-methyl-2-phenylazo)-2-naphthol-4-sulfonic acid in the composition; and
repeating the adding and adsorbing steps.

12. The method of claim 11 wherein the washing, re-intercalating and repeating steps are performed multiple times.

13. The method of claim 12 wherein the multiple times ranges from 5000 to 7000 times.

14. A method of forming a composition comprising three dimensional (3D) Sr(II)/Ir(III) layered double hydroxide, with a spheroid shape having a mean diameter of 721±13 m composed of nanohexagonal sheets intercalated with 1-(1-hydroxy-4-methyl-2-phenylazo)-2-naphthol-4-sulfonic acid, comprising the steps of:
combining in a solution a source of Sr(II) and a source of Ir(III) to produce a Sr(II)/Ir(III) solution;
combining the Sr(II)/Ir(III) solution with 1-(1-hydroxy-4-methyl-2-phenylazo)-2-naphthol-4-sulfonic acid to produce a Sr(II)/Ir(III)/1-1H-4MP-2NS solution;
combining the Sr(II)/Ir(III)/1-1H-4MP-2NS solution with a source of the hydroxyl groups to produce Sr(II)/Ir(III)OH/1-1H-4MP-2NS alkaline mixture;
exposing the alkaline mixture to microwave energy under conditions sufficient to form from the alkaline mixture a powder containing the three dimensional (3D) Sr(II)/Ir(III) layered double hydroxide, with a spheroid shape having a mean diameter of 721±13 m composed of nanohexagonal sheets intercalated with 1-(1-hydroxy-4-methyl-2-phenylazo)-2-naphthol-4-sulfonic acid.

* * * * *